United States Patent [19]

Ingels

[11] 4,139,889
[45] Feb. 13, 1979

[54] APPARATUS FOR VEHICLE POSITION INDICATION

[76] Inventor: George W. Ingels, 500 E. Robinson, Norman, Okla. 73069

[21] Appl. No.: 797,763

[22] Filed: May 17, 1977

Related U.S. Application Data

[63] Continuation-in-part of Ser. No. 477,283, Jun. 7, 1974, Pat. No. 4,024,493.

[51] Int. Cl.² .................. G06F 15/50; G09B 29/10
[52] U.S. Cl. ............................. 364/460; 340/24;
340/705; 340/747; 340/347 P; 364/424
[58] Field of Search ............. 340/24, 347 P, 286 M,
340/705, 747; 364/200, 424, 444, 450, 460

[56] References Cited
U.S. PATENT DOCUMENTS 4,084,241  4/1978  Tsumura ........................... 364/450

Primary Examiner—Felix D. Gruber
Attorney, Agent, or Firm—Robert M. Hessin

[57] ABSTRACT

Apparatus for tracking vehicle position relative to a starting point and for providing continual display of vehicle position. The apparatus includes a gyroscope and odometer for generating respective direction and distance electrical signals which are then converted to digital signals for control of a video monitor. An area map overlay may be included on the face of the monitor; and, the position indication signals may be continually transmitted to a selected central location in order to provide reference indication as to a particular vehicle.

14 Claims, 13 Drawing Figures

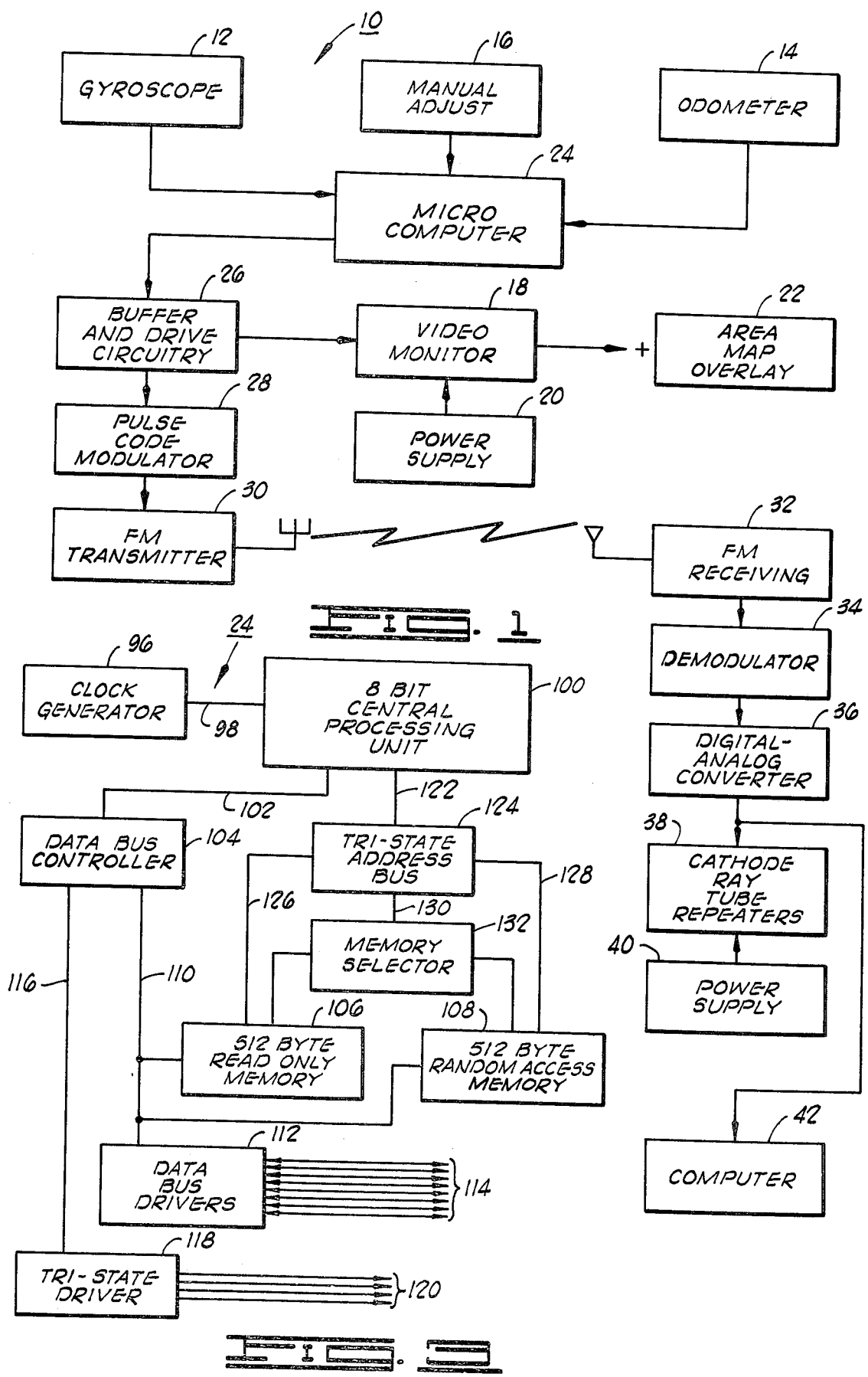

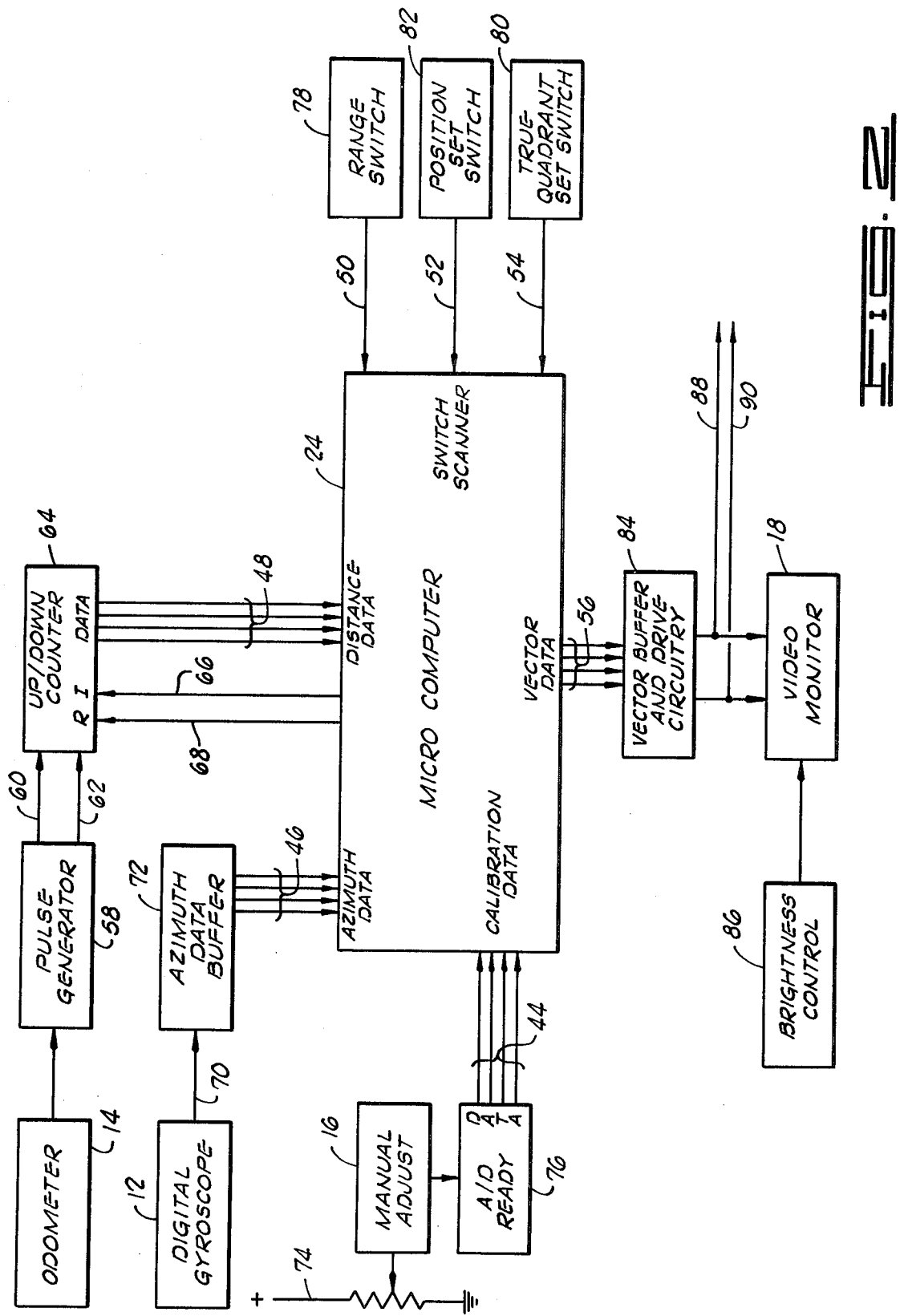

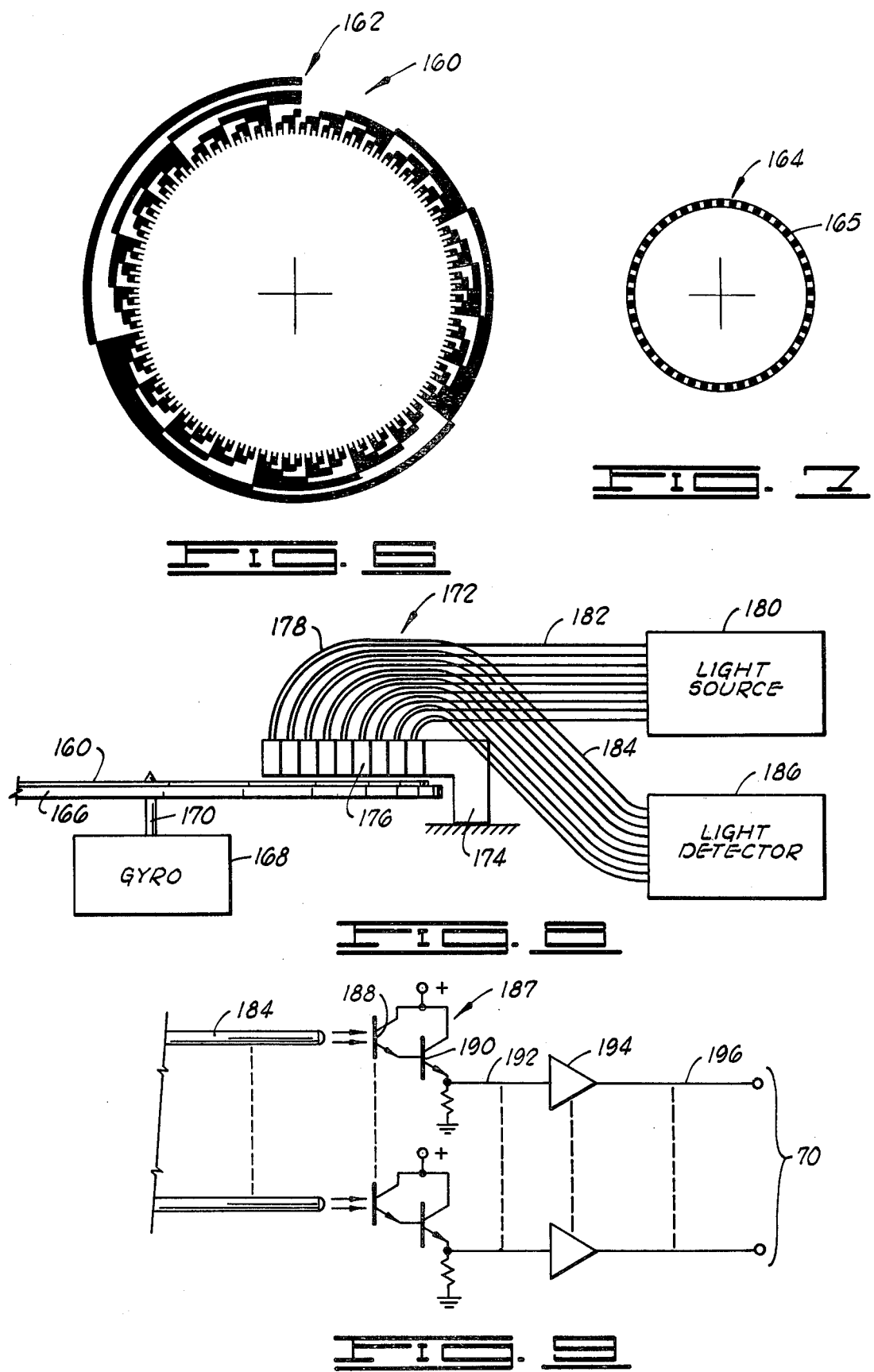

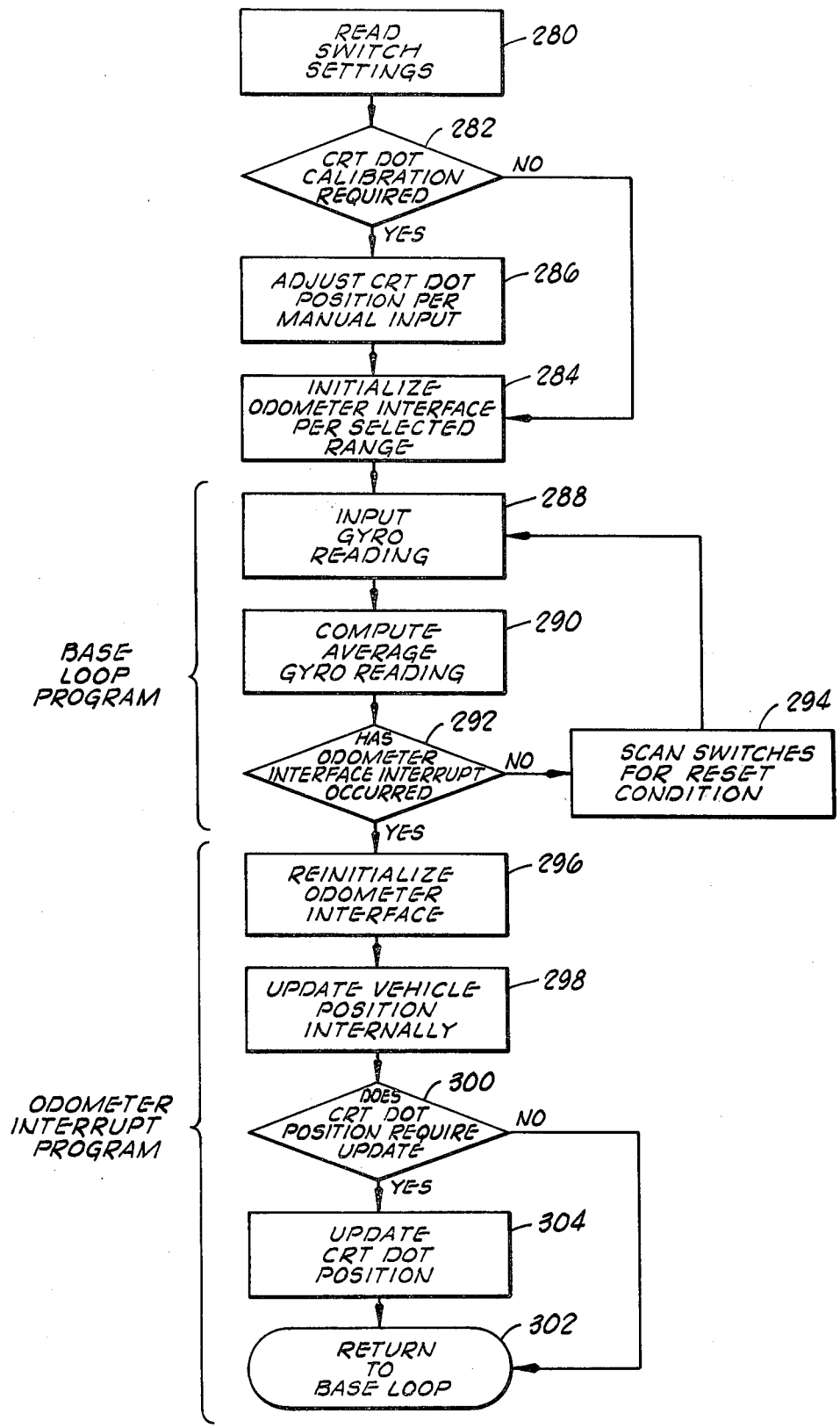

APPARATUS FOR VEHICLE POSITION INDICATION

CROSS-REFERENCE TO RELATED MATTER

The present application is a continuation-in-part of the prior co-pending U.S. application Ser. No. 477,283 filed June 7, 1974, now U.S. Pat. No. 4,024,493 and entitled "Apparatus for Motor Vehicle Position Indication".

BACKGROUND OF THE INVENTION

1. Field of the Invention

The invention relates generally to motor vehicle position indication devices and more particularly, but not by way of limitation, it relates to improved apparatus for maintaining indication of vehicle position to the operator and/or for providing indication to a central location dispatching entity.

2. Description of the Prior Art

The prior art includes various types of devices as utilized for moving vehicles, planes, ships and the like for utilizing gyroscopic and/or rate of speed indications. Such prior art teachings have generally been directed to military applications such as position indication for ships and aircraft, and such high reliability equipment has generally taken the form of very complex computerized electronic equipment. The closest known prior patent art appears to be U.S. Pat. No. 3,789,198 in the name of Henson et al. There appears to be little prior art developed with respect to relatively simplified forms of device which might be suitable for vehicle tracking use wherein costly, high reliability space-consuming equipment may not be justified.

SUMMARY OF THE INVENTION

The present invention contemplates a digital position keeping device which utilizes gyroscopic and odometric inputs to continually maintain a relative position spot indication on a video monitor disposed in the vehicle in view of the operator. It is also contemplated that such position indication data can be modulated and transmitted to a central dispatching agency from one or more vehicles thereby to provide continual indication of vehicle position to the central agency.

Therefore, it is an object of the present invention to provide a relatively low cost vehicle position indicator.

It is also an object of the invention to provide a device for displaying vehicle location with increased accuracy and reliability.

It is yet another object of the present invention to provide a digital system for continually maintaining position reference of a moving structure for monitor at a centralized agency.

Finally, it is an object of the present invention to provide a moving vehicle indicator device which can be produced at greater economy to yield increased reliability and accuracy.

BRIEF DESCRIPTION OF THE DRAWINGS

FIG. 1 is a block diagram of a position location system as constructed in accordance with the present invention;

FIG. 2 is a block diagram of a preferred form of the present invention;

FIG. 3 is a diagram of a microcomputer as utilized in the system of FIG. 2;

FIG. 6 is a plan view of a gyroscope encoding card as used in the present invention;

FIG. 7 is a plan view of an odometer encoding card;

FIG. 8 is a schematic diagram of a digital gyroscope readout apparatus used in the present invention;

FIG. 9 is a schematic diagram of light detector circuitry as used in the FIG. 8 apparatus;

FIG. 13 is a flow diagram of a microcomputer program.

DETAILED DESCRIPTION OF THE INVENTION

Figure 4:
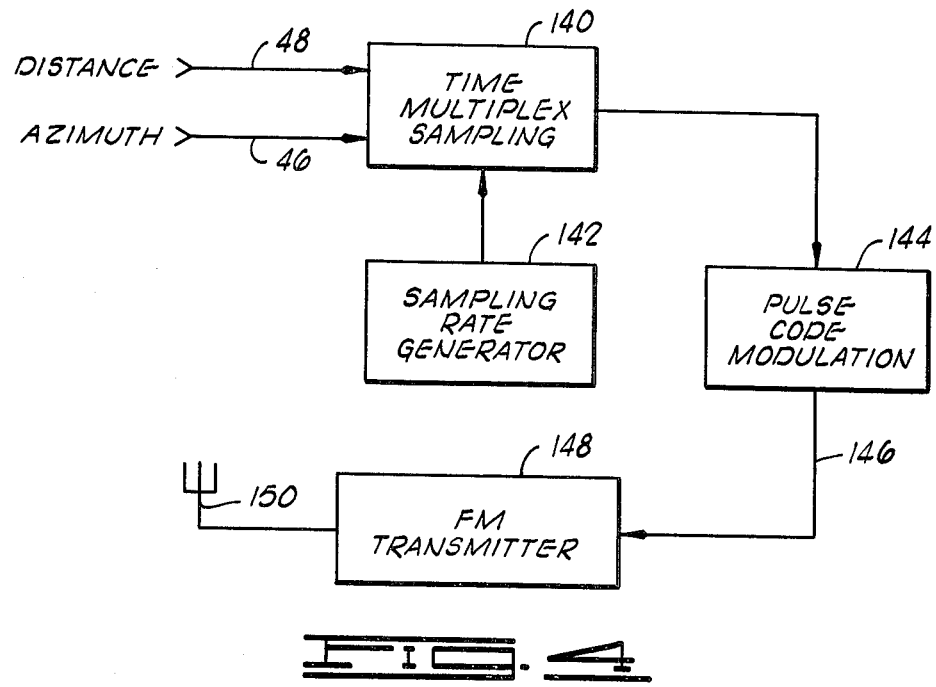
FIG. 4 is a block diagram of one form of data transmission apparatus which may be used with the present invention.

FIG. 1 represents a generalized block diagram illustrating a position location system 10 for use in moving vehicles, i.e., land, air or water craft. The system utilizes a gyroscope 12 for referencing directionality. An odometer 14, or similar air or water distance indicator, provides distance data output. Thus, in its most basic form, it is the aim of the invention to provide in a moving carrier, a video monitor indication wherein, after initial calibration and zero adjustment by a manual adjust 16, the video monitor 18 will display an x/y coordinate movement in proper direction and proportionate distance of travel of the carrier in which such a system is installed. The video monitor 18 as well as other component parts of the system are powered by a conventional form of power supply 20 as may be operated from the conventional DC power supply on board the carrier, e.g., in an automobile the conventional +12 volt power supply would be utilized.

An area map overlay 22 (to be further described), as designed in conformance to the diameter of the video monitor 18 and the range switch capabilities, may be placed in overlay over the face of the video monitor 18 such that the system can be zeroed to control the cathode ray spot and thereby trace the vehicle's path in relation to the map overlay 22. The area map overlay 22 can be designed in proper size for any area of interest once a standard calibration procedure of video monitor 18 is in effect.

Variable outputs from gyroscope 12 and odometer 14 are further processed in a microcomputer 24, as will be more particularly described below. Output from microcomputer 24 is then applied to buffer and drive circuitry 26, and digital output data from the buffer and drive circuitry 26 may then be transmitted to a remote repeater station having a similarly calibrated video monitor that is capable of then reproducing vehicle position at the remote location. In this instance, the direction and distance information is changed to pulse code modulation in a conventional modulator stage 28. The pulse code modulation may then be transmitted via frequency modulation in FM transmitter 30 for reception at an FM receiver 32 and subsequent demodulation in a demodulator 34. The digital signals are once again converted in digital/analog converter 36 for application to a cathode ray tube repeater or video monitor 38, which, under control of the power supply 40, provides cathode spot tracing of the carrier route. Here again, an area map overlay 22 may be utilized at the repeater video monitor 38. A large volume digital computer 42 may be utilized at a central location in order to process and store greater volumes of route data for one or more carriers.

FIG. 2 illustrates the control circuitry of the present invention in still greater detail. The microcomputer 24 receives a plurality of input signals such as calibration data on leads 44, azimuth data on input leads 46, and distance data on leads 48. Additionally, range input, position set input and true quadrant set input are provided on respective leads 50, 52 and 54. Vector data output from the microcomputer 24 is then presented on the group of leads 56. The odometer 14 is an optical device, to be further described in detail, wherein the odometer shaft is mechanically coupled to an optical wheel including an encoding disk. Thus, the odometer 14 functions to allow light to become modulated at a rate proportional to the distance travelled by the vehicle. Output from pulse generator 58 is then applied at the rate of 100 pulses per revolution of the odometer shaft on lead 60. A sense lead 62 is positive if the carrier is moving forward and negative if the carrier is moving backward. Signals on leads 60 and 62 are then applied to an up/down counter 64. The up/down counter 64 is periodically interrogated and reset by lead inputs 66 and 68, respectively, and proceeds at a predetermined rate, and the pulses from the pulse generator 58 are divided by the proper integer in the up/down counter 64 so that the data passed to the microcomputer 24 can be handled as calibrated distance information.

The digital gyroscope 12, to be more fully described below, is so constructed that a nine bit digital word can uniquely specify the azimuth to the nearest degree. The digital word output via line 70 is applied to an azimuth data buffer 72 which conditions the nine bit word so that it is thereafter electrically compatible with the microcomputer 24. A manual adjust 16 receives an analog voltage from the voltage divider 74 for direct application to an analog/digital converter 76. If the analog/digital ready line is asserted, the data from the analog/digital converter 76 may then be used as a correction signal to calibrate azimuth data, as input via lead group 44.

A range switch 78 serves to define for the microcomputer 24 the proper integer effective in counter 64 and thereby allows the distance information to agree with the scale associated with the map overlay at video monitor 18. A true quadrant set switch 80, when asserted by the operator, will indicate to the microcomputer 24 to treat the digital word which is presently contained in the azimuth data buffer 72 as being in the closest quadrant. Position set switch 82 allows the operator to move the current "home position" or other central designation of the field monitor in both the x and y directions. By using this positioning switch 82, the operator can force the "home position" to coincide with his current location if so desired.

All input signals to the microcomputer 24 provide the necessary raw data to make intelligent position calculations. Microcomputer 24 can sample the distance information and azimuth information at a rapid rate thereafter to make the necessary calculations to determine a location vector. A current home position when modified by a location vector then becomes the new home position. Of course, the microcomputer 24 continues to make iterations such that the home position will always be as accurate as the previous calculation. The location vector information is passed as a digital word via lead group 56 to the vector buffer and drive circuitry 84 where it is properly formatted electrically to interface with the video monitor 18. Additional software treatment maybe provided in order to scan all of the input switches previously described, and thereafter make the proper decision called for by each switch.

The output from the microcomputer 24 is a vector in the form of a digital word on lead group 56. This digital word, which contains both distance and azimuth information, is properly formatted by the vector buffer and drive circuitry 84. The formatted output signals on leads 88 and 90 may then be applied to the transmitter 30 circuitry (FIG. 1) to be telemetered to a remote location, as well as to the video monitor 18. The video monitor 18 is capable of tracking the carrier at any instant as well as to display selected alpha-numeric information if necessary.

FIG. 3 illustrates the microcomputer 24 in greater detail. The microcomputer 24 is made up of standard modular integrated circuits, hereinafter referred to as ICs. Unless otherwise noted, the IC-type chips referred to are Intel, commercially available from the Intel Corporation in Santa Clara, California.

A clock generator 102, IC-type 8224, provides timing signal input at 18 MHz by a line 98 to the clock input of central processing unit 100, IC-type 8080. The 8 BIT central processing unit 100 is the heart of the microcomputer, as it provides the necessary computational power to collect directional data from the gyroscope 12 and the odometer 14, and thereafter output the resultant direction vector as digital words to the vector buffer and drive circuitry 84 (FIG. 2). All communication with the central processing unit 100 is carried out along an 8 BIT data bus 102 from a data bus controller 104, IC-type 8228. The data bus controller 104 provides buffering between the central processing unit 100 and each of the 512 BYTE read only memory 106 and the 512 BYTE random access memory 108. The read only memory 106 consists of two parallel arrayed 2K reprogrammable PROM'S, IC-type 8702, and the random access memory 108 is made up of four parallel arrayed IC-type 2112-2, a 1024 static MOS RAM with common data input/output.

Communication between data bus controller 104 and memories 106 and 108 is made via data bus 110 which is also applied to a bi-directional data bus driver 112, two IC-type 8216 in parallel. Data bus driver 112 provides 8 BIT output via lines 114 to provide additional drive capability to interface with other memory devices, other hardware and the like. The data bus controller 104 is also connected via line 116 through a tri-state driver 118 to provide four control signal outputs via lnes 120, and these function to strobe memory or input/output data to the data bus driver 112. The tri-state driver 118 is an IC-type 74LS125, and output via lines 120 serve to control any peripherals which may be generating 8 BIT word input to data bus drivers 112.

The central processing unit 100 addresses the memory of the input/output devices along the 16 BIT address bus 122 to the tri-state address bus 124, i.e., five parallel arrayed IC-types 74LS125. The address bus driver 124 provides the necessary three-state drive capability. The eight least significant bits (LSB) are directed via lines 126 and 128 to the memory address inputs on respective read only memory 106 and random access memory 108, while the eight most significant bits (MSB) are applied via line 130 for decoding in a memory selector 132, a high speed one-of-eight binary decoder, IC-type 8205.

The power-up sequence and initialization program are contained in standard 8 BIT format form in the 512 BYTE read only memory 106. The 512 BYTE random access memory 108 is provided as a scratch pad to store computational results and variables that are then called upon for use by the central processing unit 100.

Referring now to FIG. 4, distance and azimuth information on lead groups 46 and 48 (FIG. 2) may be applied in conventional manner to a time multiplex sampling circuit 140 which functions to periodically sample the input information in time successive manner. A sampling rate generator 142 then provides pulse outputs at requisite rate to control the sampling rate and duration within time multiplex sampling circuit 140. The output from the time multiplex sampling stage 140 is then applied to a pulse code modulation stage 144 for conventional digital signal modulation whereupon the code modulated output on a line 146 is applied to FM transmitter 148 for energization of the transmitting antenna 150. The FM transmitter 148 would preferably include a crystal controlled output oscillator of characteristic frequency and identifying a particular vehicle or carrier by frequency allocation.

A central receiver station, such as that shown in FIG. 1, may include FM receiver 32 or a plurality of such receivers each tuned to a characteristic frequency identifying a selected vehicle in the area. Upon demodulation and establishment of the distance and azimuth information, a plurality of individual video monitors may be utilized, each monitor identifying a selected vehicle of the fleet. The position data information, i.e., distance and azimuth information, can alternately be applied to the computer 42 which may be properly programmed to maintain position identification of all vehicles or carriers in the area and which may also receive other input relative to the vehicle for associated storage in computer 42. Thus, by proper utilization of the computer storage, a printout for a particular vehicle over a selected period of time may be acquired in order to verify or provide a complete routing of where the particular vehicle traveled during its on-duty usage.

Figure 5:
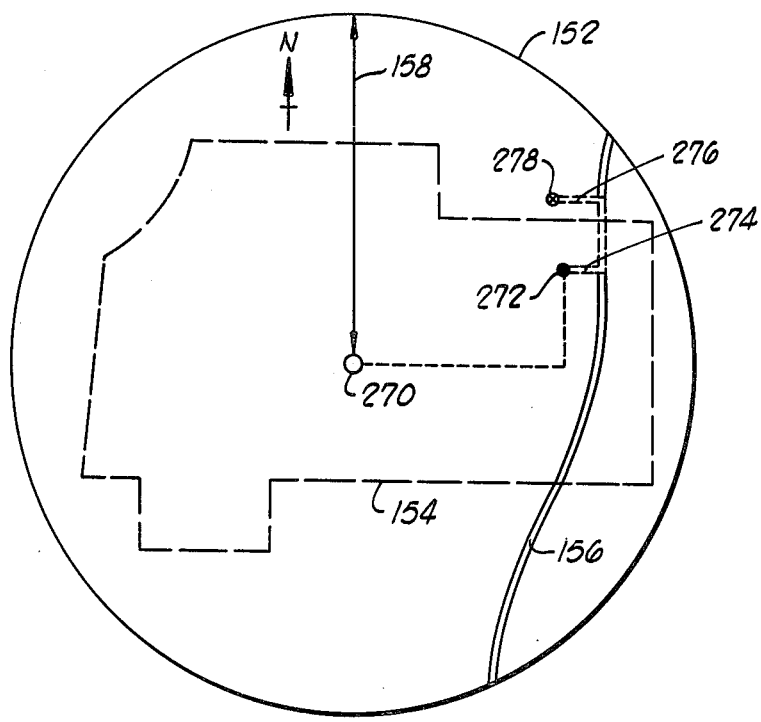
FIG. 5 is a depiction of a video monitor overlay mask which may be utilized in the present invention.

FIG. 5 illustrates a typical form of map overlay 152 which may be formed of clear plastic material to include map linings defining city limits 154, major highway 156 and/or other landmark or central locations as desired. The radius of the video monitor as shown by arrow 158 must be matched to the map overlay radius, and a multiple of map overlays 152 of different calibrated radii may be employed, one for each step of the range switch 78 (FIG. 2).

FIG. 6 illustrates an optical encoding disk 160 as used in the digital gyroscope 12 (FIG. 2) in the present system. The encoder disk 160 carries transparent/opaque markings about its circumfery and, beginning at 0° as noted by arrow 162, it provides a binary coded decimal count in 360 increments therearound. Thus, for every integral degree in the 360° circumfery there is a 9 BIT binary output indicative of that degree. Output from the odometer 14 (FIG. 2) is also taken by optical viewing of an encoding disk 164 as shown in FIG. 7. The encoding disk 164 carries about its circumfery a ring 165 consisting of a plurality of equi-spaced transparent/opaque markings, each of arcuate length selected consonant with system accuracy.

Referring to FIG. 8, the gyroscopic encoder disk 160 (FIG. 6) is carried on a suitable reflector platform 166 receiving rotation from a conventional form of gyro 168 and rotational output shaft 170. A plurality, in the present case nine, of optical fiber pairs 172 are then maintained in radial alignment relative to encoder disk 160 to provide readout of the binary code. A suitably secured brace 174 supports a plurality of plastic holder blocks 176, and each plastic block 176 maintains a fiber optic pair 178 in reading position over a selected binary annulus of encoder disk 160. In this case light reflective phenomena is utilized, and a light source 180 provides input light to respective optic fibers 182 while the reflectivity at encoder disk 160 is read by the respective optic fibers 184 for input to a light detector 186.

FIG. 9 illustrates light detector 186 in greater detail. As previously stated, there are in the present case nine such reflective light optical fibers 184 and each is ready by a respective photo Darlington transistor circuit 187. The photo Darlington transistor arrays are of commercially available type and include a light responsive NPN transistor 188 connected in cascade with a common-emitter NPN transistor 190. Emitter output is taken via lead 192 for amplification in a conventional integrated circuit amplifier 194 to provide output on a respective lead 196 within lead group 70 (FIG. 2). Thus, a plurality of outputs on leads 196 provide a 9 BIT binary word for application through azimuth data buffer 72 to microcomputer 24 for each degree from 1 through 360.

Figure 10:
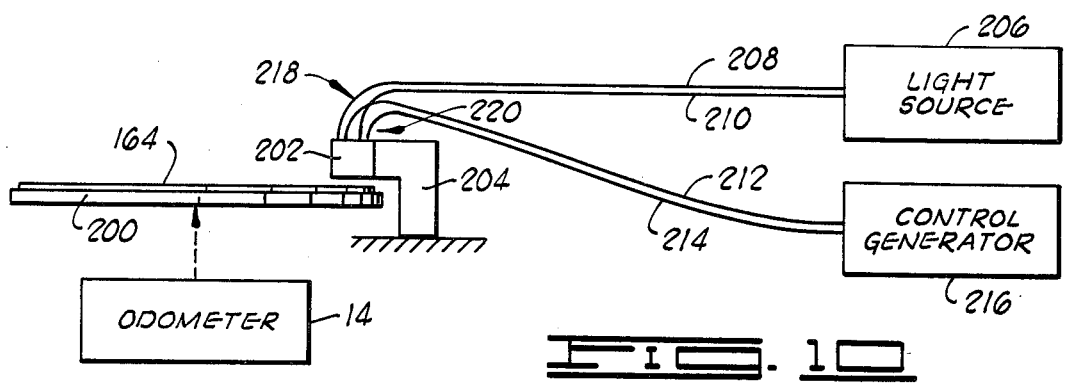
FIG. 10 is a schematic diagram of odometer readout apparatus as used in the present invention.
Figure 11:
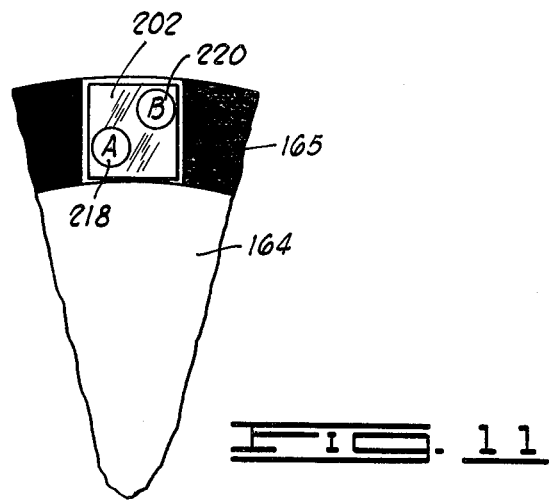
FIG. 11 is an idealized plan view depicting a portion of an odometer encoding card in relation to readout apparatus of FIG. 10.

FIG. 10 illustrates the odometer 14 and readout apparatus utilizing the encoder disk 164 (FIG. 7). Here again, a reflective platform 200 receives selective directional rotation from odometer 14, and the respective encoding ring 165 of disk 164 is read by two optical fiber pairs as rigidly affixed in a plastic holder block 202 supported by a brace 204. Here again, a light source 206 provides input light via optical fibers 208 and 210 to the block 202, and readout of light reflective characteristics are via respectively paired optical fibers 212 and 214 to control generator 216. Control generator 216 actually constitutes the input portion of the pulse generator stage 58 in FIG. 2. The optical bundle holder block 202 is positioned on brace 204 so that it maintains the optical fiber pairs 218 and 220 oppositely offset from a common radius of encoder disk 164, as shown in FIG. 11. Thus, block 202 maintains the optical fiber pairs 218 and 220, as shown by A and B, in diagonal corners over the area of an indicator block of encoder disk 164. The diagonal disposition enables determination of not only rate of movement but also direction of movement (forward or reverse), as will be further described below.

Figure 12:
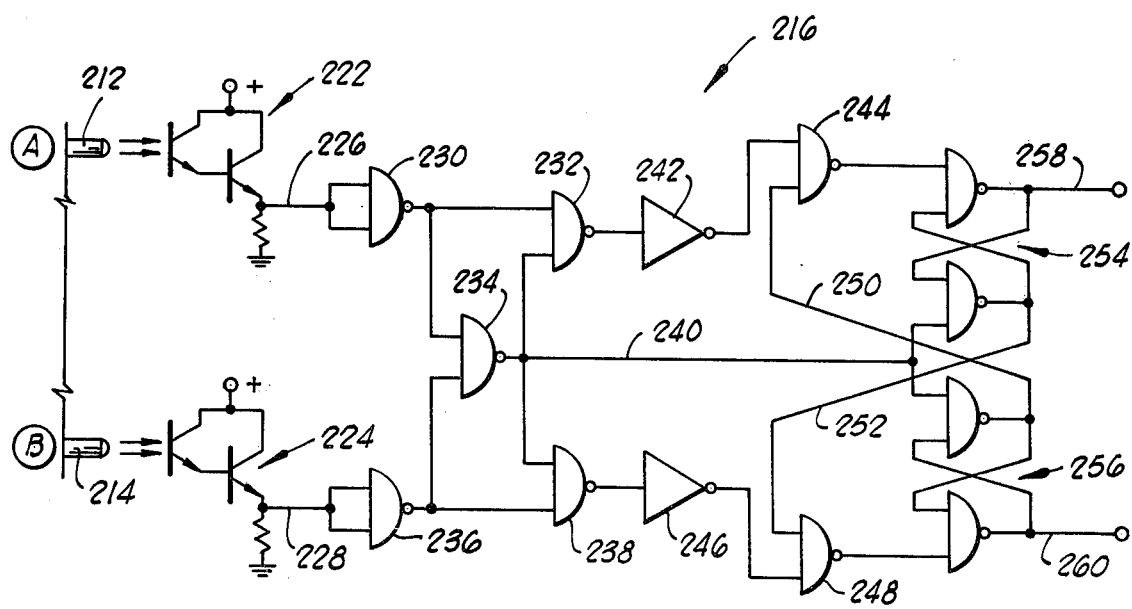
FIG. 12 is a schematic diagram of the odometer control generator of FIG. 10.

Referring to FIG. 12, each of the A and B reflected light optical fibers 212 and 214 is readout by a respective photo Darlington transistor circuit 222 and 224 to provide emitter outputs via leads 226 and 228 for processing in the NAND logic circuitry of control generator 216. Thus, pulse indication on lead 226 is applied to a NAND gate 230 with output applied to NAND gates 232 and 234. In like manner, data pulse indication on lead 228 is applied through NAND gate 236 with output applied to NAND gate 234 and NAND gate 238. NAND gates 232 and 238 are further controlled by the output from NAND gate 234 as present on a lead 240 as enabling and latching control. Pulse indication from NAND gates 232 is then applied through an inverter 242 for input to a NAND gate 244, and output from gate 238 is applied through inverter 246 to a NAND gate 248. Each of NAND gates 244 and 248 receive further latching control input from respective leads 250 and 252 from the respective output NAND gate latching combinations 254 and 256. Thus, output pulse indication of clockwise direction (vehicle forward) is provided on lead 258 and pulse output indicative of counterclockwise or vehicle reverse direction is output on lead 260.

The NAND logic circuitry determines both direction and rate of movement of encoder pattern 165 beneath block 202 (FIG. 11). In vehicle forward, the encoder disk 164 moves in the clockwise direction to provide A to B transitions; that is, movement of white to black results in an $\overline{A} \cdot B$ logic indication on respective fibers 212 and 214, with susbsequent logic control providing clockwise output on lead 258 at a pulse rate consonant with rate of rotation of encoder disk 164. In vehicle reverse, the white to black transitions will be indicative of $\overline{B} \cdot A$ logic indication at respective optic fibers 214 and 212, and thus bring about the opposite logical conclusion with repetitive pulse output on lead 260.

In operation, at some starting point the vehicle operator will adjust his video monitor spot for placement at his location. This is done by initializing the system with adjustment of range switch 78, position set switch 82 and true quadrant set switch 80 (FIG. 2) relative to his particular area as represented on map overlay (FIG. 5). Final position adjustment is made by manual adjust 16 to provide calibration data input to the microcomputer 24 (FIG. 2). Switch 80 resets any cumulative gyro error.

Thus, initialization adjustment will move the spot indicator from a video monitor center point 270 eastward and north to a vehicle location starting point 272. Thereafter, tracking movement of the vehicle, the circuitry will automatically track and control spot indicator movement as the vehicle would proceed eastward along indication 274 and north along superhighway 156 until the vehicles turns west on routing 276 to arrive at a point 278. Such spot movement can be observed by the operator of the motor vehicle in which the video monitor is installed or, the same data can be transmitted via a transmitter system as shown in FIG. 4 to provide such surveillance data to a central location, e.g., a police or tax cab dispatching agency. As previously discussed, the same information can be continually input for storage in a general purpose computer 42 (FIG. 1) such that an on-duty route of one of the vehicles can always be recalled from storage and printed out to show the vehicle movement during its entire duty tour.

Referring again to FIG. 2, after initialization and during vehicle movement, input data from odometer 14 and digital gyroscope 12 are applied in proper format to the microcomputer 24 which is controlled in accordance with a resident program carried by the read only memory circuit 106 therein. Programming of the Intel component microcomputer 24 is carried out in well-known manner to provide the requisite data analysis, calculation and processing functions which provide final output of vector data via lines 56 through vector buffer and drive circuitry 84 to provide spot indicator control on video monitor 18.

FIG. 13 represents a flow diagram illustrating the general data processing to be accomplished in microcomputer 24 by the 8 BIT format programming present on read only memory 106 (FIG. 3). Initialization is carried out from the read switch setting stage 280 for introduction to a decision stage 282 to determine whether or not video monitor dot calibration is required. If not, processing proceeds to stage 284 for initialization of the odometer interface in accordance with the selected video monitor range. If calibration is required in decision stage 282, it is necessary to manually adjust the spot position as indicated by flow stage 286.

After initialization of the odometer range scale, gyroscope reading input is received in accordance with flow stage 288 with subsequent computation of an average gyro reading in stage 290. Next occurs a decision stage 292 which queries as to whether or not the odometer interface interrupt has occurred. If not, the switches are scanned to determine a reset condition as per stage 294 with data flow back to the input gyro reading stage 288. If the odometer interface interrupt has occurred, flow proceeds to processing stage 296 to effect reinitialization of the odometer interface. The data at this point is then continually subject to updating of vehicle position internally as per stage 298 whereupon a decision stage 300 queries as to proper position of the video monitor spot indicator and whether or not it requires update. If not, flow proceeds to end stage 302 which signifies return to base loop. If spot indicator position does require update, such update is effected in flow stage 304 prior to processing through the end stage 302. Such data processing maintains the video monitor spot indicator continually in position of the vehicle travel as is directly indicated relative to the map overlay, as shown in FIG. 5.

The foregoing describes a novel vehicle tracking and indication system which can be constructed and utilized with relatively much greater economy than presently known direction and location systems. In addition, the system has capability of being used for leisure time tracking or auto amusement as well as service vehicle tracking, and various applications wherein it is desirable to maintain position and route knowledge relative to a plurality of vehicles. It is also contemplated that the device can be used with emergency vehicles who must travel at increased speed through downtown areas, as the central indication will provide the dispatching agency with forewarning in order to change traffic lights or otherwise clear the emergency route. Still other forms of mass transit vehicle systems presently in genesis may well employ the present invention and equivalents for position keeping and system surveillance.

It should also be understood that the use of the term vehicle in the present application is employed in its true sense to mean any carrier or conveyance. Therefore, it is well within contemplation of the present invention that such tracking apparatus will find particular application for use in aircraft and marine small craft. In such applications, obvious changes are necessitated by employing an air speed type of indicator device in place of the described odometer and, in marine applications the similar basic sensor adjustment would be made with substitution of water volume and rate measurement.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A system for maintaining position surveillance of moving vehicles, comprising:
   means generating a pulse output proportional to distance traveled by said vehicle;
   counter means receiving said pulse output to generate periodically a distance digital word data output;
   means generating an azimuth digital word data output indicating the degree of vehicle heading;
   microcomputer means receiving input of said distance digital word and said azimuth digital word data outputs to provide output of vector digital data, said microcomputer means including a central processing unit receiving selective input of said distance and azimuth digital word data to generate output of said vector digital word data, and a read only memory means having a selected, resident program that is connected to control the logic processing of said central processing unit; and
   video monitor means receiving said vector digital word data output to continually display relative vehicle position.

2. A system as set forth in claim 1 wherein said microcomputer means comprises:
   random access memory means functioning in coaction with said central processing unit and said read only memory means as a scratch pad storage.

3. A system as set forth in claim 2 wherein said microcomputer means comprises:
   three state address bus means controlling data flow in the form of plural bit address words between said central processing unit and each of said read only memory and said random access memory; and
   data bus controller means controlling data flow in the form of plural bit data words between said central processing unit and each of said read only memory and said random access memory.

4. A system as set forth in claim 3 wherein:
   said address words are 16 bits and said data words are 8 bits.

5. A system as set forth in claim 3 which comprises:
   decoding means receiving 8 most significant bits of said address words from said three state address bus means with memory selection output to each of said read only memory and random access memory.

6. A system as set forth in claim 1 wherein said means generating a pulse output, comprises:
   odometric means providing rotational output;
   encoder disk means having equi-spaced opaque/transparent annular marking and receiving input of said rotational output; and
   optical means reading said encoder disk annular marking to generate said pulse output.

7. A system as set forth in claim 6 wherein said optical means comprises:
   at least one optical fiber pair directing light and receiving reflected light from said annular marking; and
   phototransistor means responsive to said received reflected light to generate a characteristic output.

8. A system as set forth in claim 1 wherein said means generating an azimuth digital word data output, comprises:
   azimuth sensing means providing a rotational output;
   azimuth encoder disk means receiving said rotational output and having an opaque/transparent reflective annular marking that represents a distinctive binary coded decimal indication for each integral degree about said annular marking; and
   optical means reading said binary coded decimal annular marking to generate said azimuth digital word data output.

9. A system as set forth in claim 8 wherein said optical means reading said binary coded decimal annular marking, comprises:
   nine pairs of light directing/reflection receiving optical fibers secured in radial alignment relative to said azimuth encoder disk in reading position to nine respective binary annular markings; and
   plural means each responsive to one of said reflector receiving optical fibers to generate a characteristic output.

10. A system as set forth in claim 6 wherein said means generating an azimuth digital word data output, comprises:
    azimuth sensing means providing a rotational output;
    azimuth encoder disk means receiving said rotational output and having an opaque/transparent reflective annular marking that represents a distinctive binary coded decimal indication for each integral degree about said annular marking; and
    optical means reading said binary coded decimal annular marking to generate said azimuth digital word data output.

11. A system as set forth in claim 10 wherein said optical means reading said binary coded decimal annular marking, comprises:
    nine pairs of light directing/reflection receiving optical fibers secured in radial alignment relative to said azimuth encoder disk in reading position to nine respective binary annular markings; and
    plural means each responsive to one of said reflector receiving optical fibers to generate a characteristic output.

12. A system as set forth in claim 1 which is further characterized to include:
    time multiplex sampling means receiving said vector digital data output to generate a multiplex signal output;
    means for modulating and transmitting said multiplex frequency signal;
    means at a designated central location for receiving said carrier frequency signal and demodulating to produce said vector digital output; and
    means utilizing said vector digital output to produce a visual display indicating relative vehicle position.

13. A system as set forth in claim 1 wherein said means to continually display relative vehicle position comprises:
    visual monitor means including a visual presentation area that is range adaptable for selected areas of said moving vehicle movement; and
    transparent map overlay means for superposition over said visual presentation area.

14. A system as set forth in claim 13 which further includes:
    a plurality of transparent map overlays, one for each selected area range of said visual presentation area.

* * * * *

UNITED STATES PATENT AND TRADEMARK OFFICE
CERTIFICATE OF CORRECTION

PATENT NO. : 4,139,889
DATED : February 13, 1979
INVENTOR(S) : George W. Ingels

It is certified that error appears in the above-identified patent and that said Letters Patent are hereby corrected as shown below:

Column 4, line 8 separate the word "maybe" to indicate two words -- may be --;

Column 4, line 57 change "lnes" to -- lines --; and

Column 10, line 46 insert -- signal output at selected carrier -- after the word "multiplex" and before the word "frequency" in line 47.

Signed and Sealed this

Twenty-ninth Day of May 1979

[SEAL]

Attest:

RUTH C. MASON
Attesting Officer

DONALD W. BANNER
Commissioner of Patents and Trademarks